United States Patent [19]

Ushiro et al.

[11] Patent Number: 4,891,517

[45] Date of Patent: Jan. 2, 1990

[54] HEAT SENSITIVE COPYING MACHINE

[75] Inventors: Seimei Ushiro; Kenta Namioka; Hiroshi Ohmura; Michio Cho; Kimiaki Nakada; Tokuji Sato; Takeshi Watanabe, all of Tokyo, Japan

[73] Assignee: Fuji Photo Film Co., Ltd., Kanagawa, Japan

[21] Appl. No.: 222,821

[22] Filed: Jul. 22, 1988

[30] Foreign Application Priority Data

| Jul. 22, 1987 | [JP] | Japan | 62-183046 |
| Aug. 28, 1987 | [JP] | Japan | 62-214660 |
| Aug. 28, 1987 | [JP] | Japan | 62-131292[U] |
| Aug. 31, 1987 | [JP] | Japan | 62-217514 |
| Sep. 8, 1987 | [JP] | Japan | 62-224637 |

[51] Int. Cl.$^4$ .............................................. G03C 5/66
[52] U.S. Cl. .................................. 250/318; 250/316.1; 355/41
[58] Field of Search ............... 250/316.1, 317.1, 318, 250/319; 219/716; 355/18, 19, 21, 84, 41; 346/76 PH; 340/707; 400/120, 103

[56] References Cited

U.S. PATENT DOCUMENTS

| 3,655,970 | 4/1972 | Betzler | 250/316.1 |
| 4,264,197 | 4/1981 | Pone et al. | 355/41 |
| 4,547,784 | 10/1985 | Erlichman et al. | 250/318 |
| 4,635,010 | 1/1987 | Miyai et al. | 355/21 |
| 4,641,159 | 2/1987 | Seitz et al. | 427/152 |
| 4,716,291 | 12/1987 | Sakamoto et al. | 250/317.1 |
| 4,802,014 | 1/1989 | Koga | 346/76 PH |
| 4,823,165 | 4/1989 | Marukawa et al. | 355/41 |
| 4,825,074 | 4/1989 | Yoshikawa | 250/316.1 |
| 4,841,154 | 6/1989 | Yoshikawa et al. | 250/316.1 |

FOREIGN PATENT DOCUMENTS 60-20685 2/1985 Japan.

Primary Examiner—Janice A. Howell
Assistant Examiner—Kiet Nguyen
Attorney, Agent, or Firm—Young & Thompson

[57] ABSTRACT

A copying machine for making a hard copy of an original comprises an image sensor for reading an image of the original to provide image signals, a memory for memorizing the image signals after or before processing the image signals for necessary corrections, and a printer for printing an image on a copying sheet according to the image signal after image processing. Preferably, a thermal printing head and a heat sensitive sheet are used. The copying machine is compact and either is incorporated in a portable overhead projector or is used as a writing board copy machine. In the former case, the image sensor is disposed in a supporting arm for supporting an image projection lens assembly above a base section of the overhead projector on which a transparent original is placed. The image sensor reads a reflecting original to provide image signals and the thermal printing head prints a mirror image of the reflecting original on a transparent heat sensitive sheet according to the image signals provided by the image sensor, thereby providing a transparent secondary original instantly for projection. In the latter case, the machine includes a pattern projector for projecting a light pattern which will be deformed on the remote original according to position of the copying machine, whereupon a correcting circuit provides a correction signal. The heat sensitive sheet is formed with indicia near front and rear diagonally opposite edges, symmetrically with respect to the center of the sheet, to indicate at least the surface of the sheet to which a heat sensitive material layer is applied.

27 Claims, 12 Drawing Sheets

HEAT SENSITIVE COPYING MACHINE

BACKGROUND OF THE INVENTION

The present invention relates to a heat sensitive copying machine and a heat sensitive sheet for use therewith.

There are various kinds of heat sensitive copying machines. One such heat sensitive copying machine is used to make a transparent original carrying an image such as characters, illustrations and/or drawings to be projected by the use of an overhead projector onto a remote screen. Recent overhead projectors are portable so as to be easily carried around. However, if it is needed to make a transparent original where the overhead projector is used, it is usual that there is no copying machine.

For making it possible to make transparent originals anywhere an overhead projector is used, a portable overhead projector with a heat sensitive copying device built therein has been disclosed in Japanese Patent Appln. No. 62-110,300. With the overhead projector with a built-in heat sensitive copying device mentioned above, it is quite convenient to make and project transparent originals as needed. The overhead projector with a built-in heat sensitive copying device uses a transparent heat sensitive sheet with a recording layer containing particles which are blackened by heat applied by a thermal printing head so as to form thereon the same image as on an original. A copied transparent original is placed with the recording layer side up on a reflecting Fresnel plate of the overhead projector to be projected onto a remote screen.

Such transparent originals are generally apt to curl concavely with the recording layer inside due to the application of radiant heat thereto. When such a curled transparent original is placed on the reflecting Fresnel plate and illuminated from the back by a light for projection, it becomes more curled. This leads a fuzzy or out-of-focus image projected onto the remote screen.

There are sometimes the need to write notes on the transparent original while projecting the same. In such cases, because the transparent original is placed with the recording layer outside, and because there are some compositions of recording layers that do not receive ink, it is hard to write notes on the transparent original. Even if it is possible to write notes on the recording layer of the transparent original, the recording layer can be damaged when the written notes are rubbed out.

Another type of such heat sensitive copying machine is known, in the form of a so-called electronic writing board which is a writing board capable of making a hard copy of notes, illustrations or the like written thereon. One such electronic writing board includes a writing surface such as the writing board itself or a sheet drawn over the writing board from a roll, on which notes, illustrations or the like are written. An image of a selected part of the writing sheet is electrically read by an image sensor such as a CCD sensor and printed out as a hard copy.

Such writing boards with heat sensitive copying machines incorporated are not only difficult to carry around but also incapable of making hard copies of surfaces or materials on the surfaces of usual writing boards. For solving this problem, an apparatus for copying a surface of a writing board is disclosed in, for example, Japanese Patent Unexam. Publ. No. 60-20,685. The writing board copying apparatus mentioned above includes a video camera for taking an image of a surface of a writing board and a printer for printing out the video image as a hard copy.

One problem with the writing board copying apparatus described above is that the apparatus is not always located in front of a writing board so as to view directly the center of the writing board. If it is located off-center of the writing board, the writing board copying apparatus views the center of the writing board at an angle. Therefore, the copies image is unavoidably subjected to the effect of perspective, resulting in a distorted image.

Another problem with such writing board copying apparatus is that the apparatus is not always located at the level of the center of the writing board. Therefore, the apparatus is usually inclined upward at an angle so as to view the center of the writing board, resulting in the occurrence of distortion.

On the other hand, there are various kinds of heat sensitive sheets which differ in size, thickness, heat sensitivity and color tone. For adapting the heat sensitive copying apparatus for use with such various kinds of heat sensitive sheets, the apparatus should be changeable as to printing conditions according to characteristics of each hat sensitive sheet used. Such a selection of printing conditions is troublesome and makes it impossible to effect quick printing.

OBJECTS OF THE INVENTION

It is, therefore, an object of the present invention to provide a portable overhead projector equipped with a copying mechanism for making it possible to provide transparent originals anywhere and anytime these transparent originals are needed.

It is another object of the present invention to provide a portable heat sensitive copying machine which can make a hard copy free from distortion.

It is still another object of the present invention to provide a heat sensitive sheet which can allow a heat sensitive printing machine to read automatically the characteristics of the heat sensitive sheet so as automatically to set the proper printing conditions therein.

SUMMARY OF THE INVENTION

The above objects of the present invention are accomplished by providing an overhead projector provided with a heat sensitive copying device comprising an image reading head for reading a reflecting primary original to provide image signals, and a printing head for printing an image on a transparent sheet according to the image signals read.

According to a preferred embodiment of the invention, the printing head is a thermal printing head adapted to form a thermal image on a transparent heat sensitive sheet. The transparent heat sensitive sheet with a mirror image as a secondary original is placed the image side back on a Fresnel plate of the overhead projector and illuminated from the image side.

The overhead projector has a projection lens assembly held above the Fresnel plate by a hollow supporting arm to project an image of a transparent original illuminated from the back through the Fresnel plate onto a remote screen. In the hollow supporting arm, there is provided an image reading head in the form of a line sensor to read a line image of a reflecting primary original to provide time serial image signals which are memorized in a frame memory for one original.

The transparent heat sensitive sheet on which a thermal image is formed has an indicium indicating the surface of the sheet to which a thermal recording layer is applied. This indicium is applied at positions on the opposite front and rear edges or sides of the transparent heat sensitive sheet symmetrically with respect to the center of the transparent heat sensitive sheet. Either indicium is detected by a mark detector only when the transparent heat sensitive sheet is placed in the correct way in the overhead projector.

The indicium is preferably provided by a plurality of code marks thermally recorded on the heat sensitive sheet so as to identify the characteristics of the heat sensitive sheet such as its heat sensitivity, size, thickness, color and the like. These code marks can be applied to each heat sensitive sheet at positions along or near front and rear edges thereof formed upon cutting a long web of heat sensitive paper to sheets.

According to a preferred embodiment of the present invention, the heat sensitive copying device can be provided as a portable copying machine convenient to carry around and to make instantly a hard copy or a secondary original for an overhead projector either from written material such as literature, drawings or the like, or notes written on a writing board. The heat sensitive copying machine includes means for correcting the effect of perspective upon making a hard copy of a large original image such as a writing board. This correcting means comprises light pattern projecting means for detecting a geometrical perspective of the original and means for changing the geometrical perspective into an electric signal. Based on the electric signal indicating the geometrical perspective, image signals of the original provided by the image reading head are electrically processed to eliminate the effect of perspective so as to provide a hard copy with a generally rectangular image.

In still another preferred embodiment of the present invention, the image reading head is provided with means for moving up and down an image taking lens so as to view the center of a large original such as a surface of a writing board. Owing to the provision of the image taking moving means, copies are not subject to the distortion which occurs when the optical axis of the image taking lens is inclined at an angle with respect to the surface of a large original such as a writing board.

BRIEF DESCRIPTION OF THE DRAWINGS

The above and other objects, features and advantages of the present invention will be fully understood from the following description given as to preferred embodiments thereof with reference to the accompanying drawings wherein the same or similar parts are designated by like reference numerals throughout the drawings and in which.

DETAILED DESCRIPTION OF THE INVENTION

Figure 1:
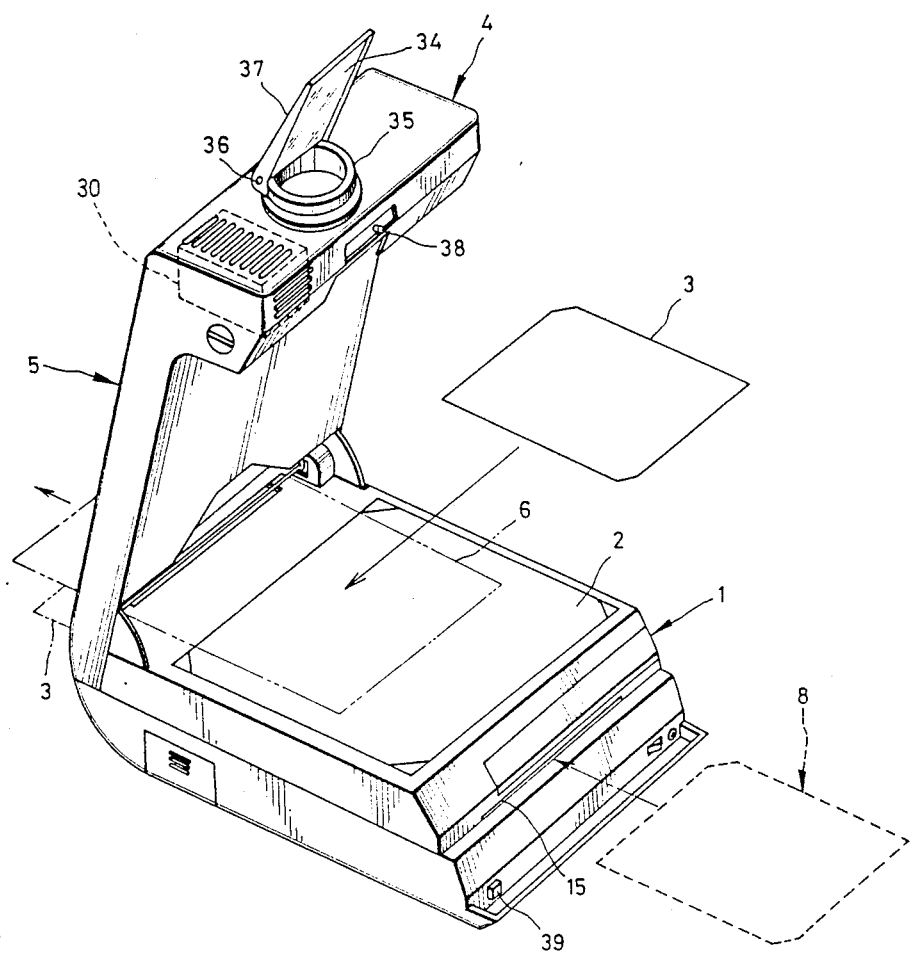
FIG. 1 is a perspective view showing an overhead projector in use, according to a preferred embodiment of the present invention.
Figure 2:
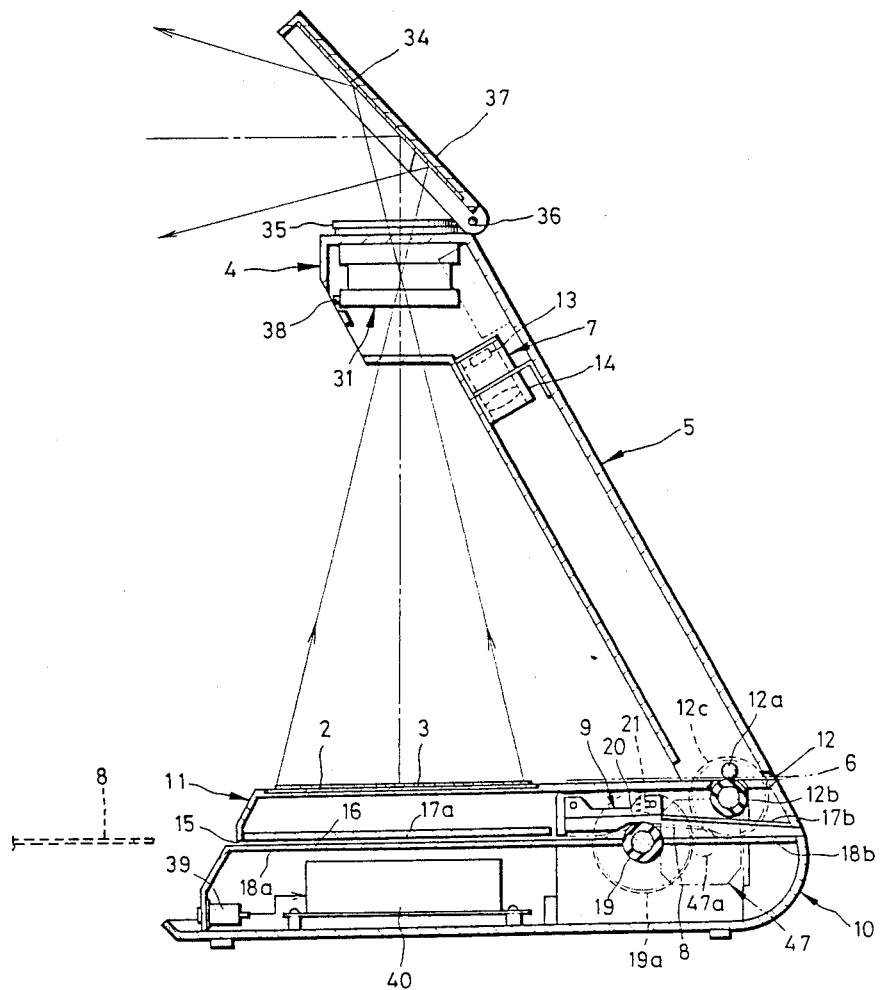
FIG. 2 is a sectional view of the overhead projector of FIG. 1.
Figure 3:
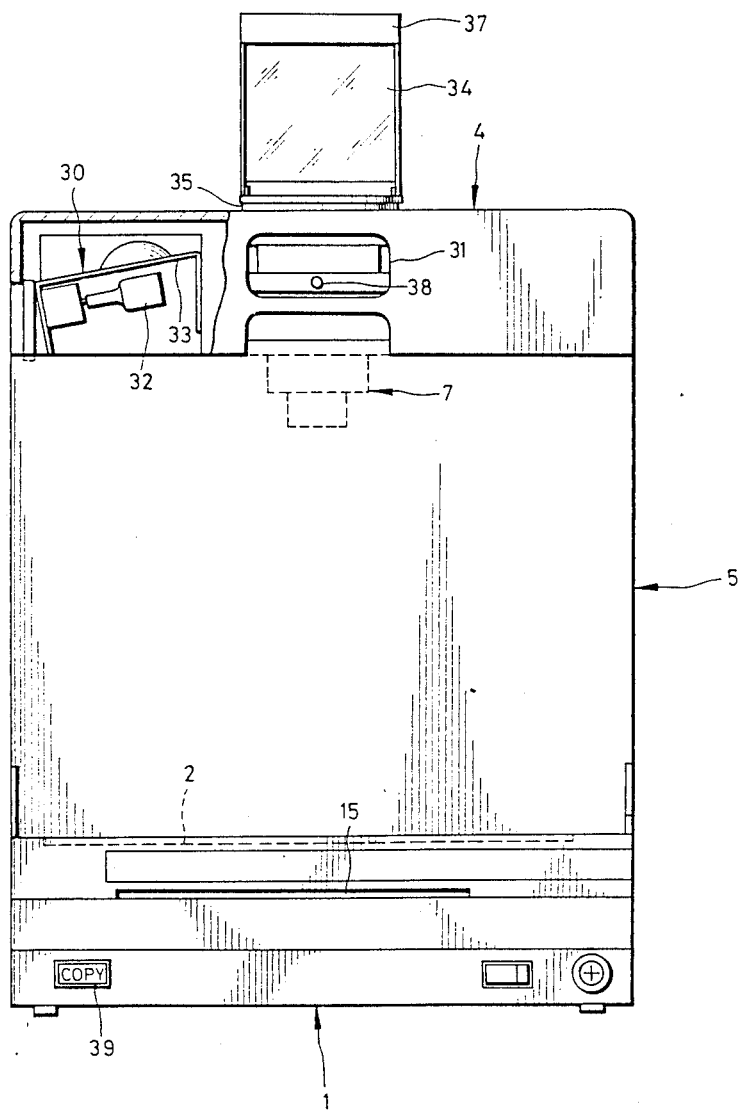
FIG. 3 is a front view of the overhead projector of FIG. 1.

Referring now to FIGS. 1 to 3, shown therein is a reflection-type overhead projector in which the heat sensitive copying machine is incorporated. As shown, the overhead projector basically comprises a box-shaped base 1 with a Fresnel mirror plate 2 attached thereto, a projection head 4 comprising a lens-and-mirror assembly disposed above the base 1 for projecting an image carried by a secondary original 3 placed on the Fresnel mirror plate 2 onto a remote screen (not shown), a gooseneck hollow arm 5 supporting the projection head 4 at its top at an angle, an image scanning or reading head 7 including a line sensor such as a CCD image sensor array 13 and a focusing lens 14 which is disposed inside the hollow arm 5 for reading the image carried by a primary original 6 to provide image signals, and a recording head 9 for recording the image signals as a mirror image of the image scanned, on a transparent sheet 8, thereby providing the secondary original transparency 3.

The hollow arm 5 is connected to the base 1 by means of a hinge 10. The hinge 10 is provided with a click stop mechanism well known to those skilled in the art so as to position the arm 5 in order to bring the projection head 4 into parallel with the Fresnel mirror plate 2.

For allowing the image scanning head 7 to read the image carried by the primary original 6, there are a pair of driven rollers 12a and 12b disposed at the bottom of the hollow arm 5 to transport the primary original 6 at a constant speed.

At its end opposite the hinge 10, the base 1 is formed with a slit 15 for allowing the transparent sheet 8 such as a heat sensitive transparent sheet to enter into a guideway 16 parallel to the Fresnel mirror plate 2. For guiding the transparent sheet parallel to the Fresnel mirror plate 2, the guideway 16 is formed within the base 1 by guide plates 17a, 17b, 18a and 18b.

The recording head 9 is disposed near the hinge 10 and between the guide plates 17a and 17b. The recording head 9 includes a thermal printing head 20 and a platen roller 19 by which the transparent sheet 8 is transported. The thermal printing head 20, which is well known per se and is linear and transversely disposed, is pressed down against the platen roller 19 by a coil spring 21.

The transporting roller 12b and the platen roller 19 are driven in rotation by a gear 47a which is driven by a pulse motor 47 and is in mesh with gears 12c and 19a attached to their shafts. Therefore, the platen roller 19 is synchronized with the transporting roller 12b. The transporting roller 12a and the thermal printing head 20 are adapted to provide the necessary space when a primary original or a transparent sheet is inserted into the slot 12 or guideway 16, respectively.

The projection head 4 at the top of the hollow arm 5, as is shown in detail in FIGS. 1 and 3, has a lamp housing 30 including a lamp 32 such as a halogen lamp and a reflector 33 to illuminate uniformly an original placed on the Fresnel mirror plate 2, and a projection lens assembly 31 for projecting a magnified image carried by the original on the Fresnel mirror plate 2.

Above the projection lens assembly 31 there is provided a reflective mirror 34 for reflecting the projected image in the forward direction so as to project it onto a remote screen. The reflective mirror 34 is held by a mirror holder 37 which is pivoted by a pivot shaft 36 on a ring member 35 which in turn is rotatably mounted on the projection head 4. The provision of the ring member 35 being rotatably mounted and pivotally supporting the reflection mirror 34 makes it possible to project an image at a desired angle and in any desired direction. Shown at 38 is a focusing knob for the projection lens 31.

Figure 4:
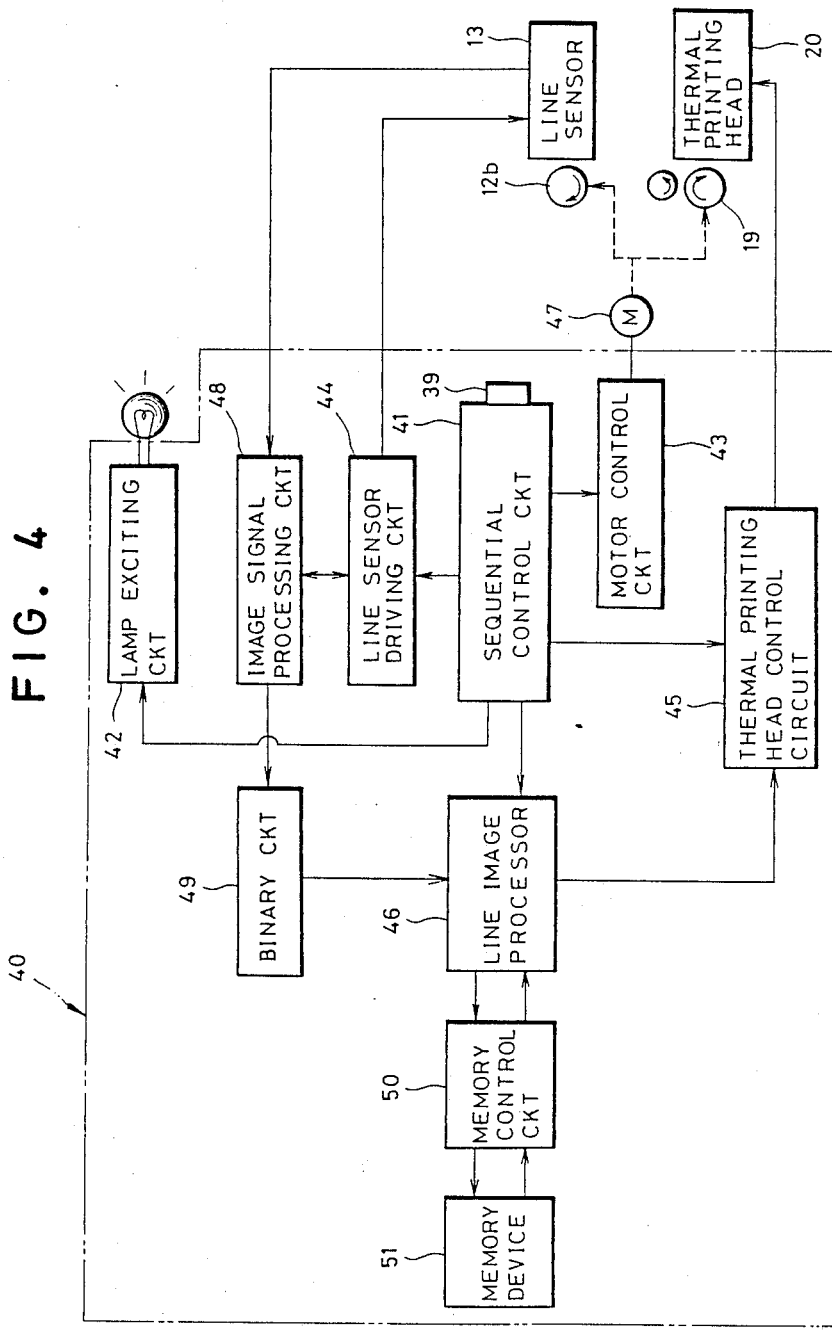
FIG. 4 is a block diagram showing a control circuit used in the overhead projector of FIG. 1.
Figure 5:
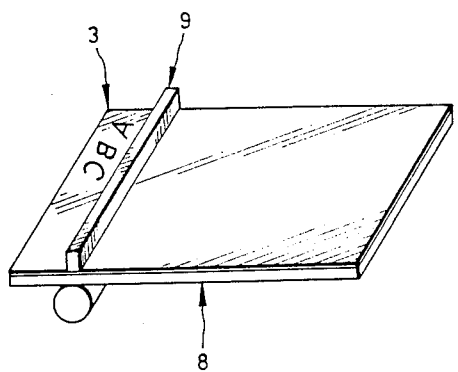
FIG. 5 is an illustration schematically showing the fundamentals of thermal copying according to the present invention.

The overhead projector is controlled by a built-in controller 40 whose circuit is shown in FIG. 4. The controller 40 includes a sequence control circuit 41 having a memory in which a sequence control program is memorized. When a copy switch 39 provided in the base 1 is operated, a programmed sequential control is started to control a lamp exciting circuit 42, a motor control circuit 43, an image scanning line sensor control circuit 44, a thermal printing head control circuit 45, and a line image processing circuit 46.

In the case of making a secondary transparent original 3 from a primary original 6 such as a reflecting hard copy, the thermal printing head 20 and the transporting roller 12a are moved up so as to allow the primary original 6 to be inserted between the rollers 12a and 12b. A transparent sheet 8 is inserted into the guideway 16 with its reading end disposed between the platen roller 19 and the thermal print head 20. Then, the copy switch 39 is operated to initiate the sequential program of operation. The lamp exciting circuit 42 excites a lamp to illuminate the primary original 6, and simultaneously the motor control circuit 43 causes the motor 47 to rotate so as to turn the transporting roller 12a and the platen roller 19 in synchronism with each other, thereby transporting the primary and secondary originals 6 and 8.

Upon the transportation of the primary original 6, a line image of the primary original 6 is formed on the line image sensor 13 through the focusing lens 14. The line image sensor 13 is driven by the driver 44 to provide timed serial, i.e. sequential image signals for each line image which, in turn, are sent to the image processing circuit 48.

The image signal processing circuit 48 is synchronized with the line image sensor 13 by the driver 44 to effect the necessary signal processing of the sequential image signals and to send them to a binary circuit 49 wherein the sequential image signals in analog form are transformed into binary signals with a predetermined threshold level. The binary signals as digital image data are sent to a line image processor 46 and then to the memory device 51 as a buffer memory through a memory control circuit 50 for temporary storage. The digital image data in the memory device 51 are transmitted to the thermal printing head control circuit 45 in sequence through the line image processor 46.

The thermal printing head control circuit 45 receives drive signals synchronized with motor drive signals for the motor 47 from the sequence control circuit 41 and drives the thermal printing head 20 so as to print a thermal image, which is a mirror image of the primary original 6, on a heat sensitive layer 3a of the transparent heat sensitive sheet 8 transported at a constant speed based on the digital image data.

At the end of thermal printing for the primary original 6, the sequence control circuit 46 provides the lamp exciting circuit 42, line sensor drive circuit 44, thermal printing head drive circuit 45 and line image processor 46 with end signals to terminate the sequential operation. The sequence control circuit 46 then controls the motor drive circuit 43 to stop the motor 47 when the primary original 6 and the heat sensitive transparent sheet 8 as a secondary original are discharged from the base 1.

Figure 6:
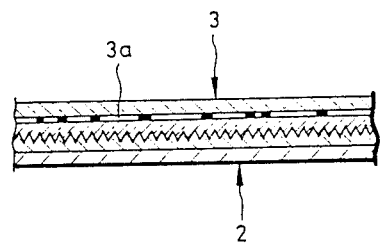
FIG. 6 is a fragmentary cross section showing a secondary original placed on a Fresnel plate of the overhead projector.

The secondary original 3 is placed on the Fresnel mirror plate 2 with the heat sensitive layer 3a placed underside. Upon exciting the projection lamp to illuminate the secondary original 3, an image analogous to the image of the primary original 6 is projected onto the remote screen. Because the secondary original 3 made of a transparent heat sensitive sheet is so positioned as to place the heat sensitive layer 3a in contact with the Fresnel mirror plate 2 as is shown in FIG. 6, the projected image on the remote screen will be quite clear. Because the secondary original 3 is placed on the Fresnel mirror plate 2 front side (heat sensitive layer 3a) down when being projected, it is easy to write notes on the back of it without interfering with the image.

Figure 7:
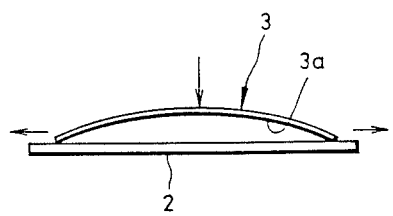
FIG. 7 is an illustration schematically showing a secondary original curled on the Fresnel plate.

As is shown in FIG. 7, since the secondary original 3 is placed on the Fresnel mirror plate 2 with the thermal recording layer 3a down, the secondary original 3 is not only flattened by its own weight but also is prevented from curling due to the thermal radiation of illumination lamp. As a result, any gap between the secondary original 3 and the Fresnel mirror plate 2 will be only very small, resulting in a sharply focused image on the remote screen.

As will be apparent from the above description, thanks to the arrangement of the image scanning head 7 within the gooseneck hollow arm 5, the overhead projector is made compact and a large space is provided for the image sensor 13 without making the overhead projector bulky.

Figure 8:
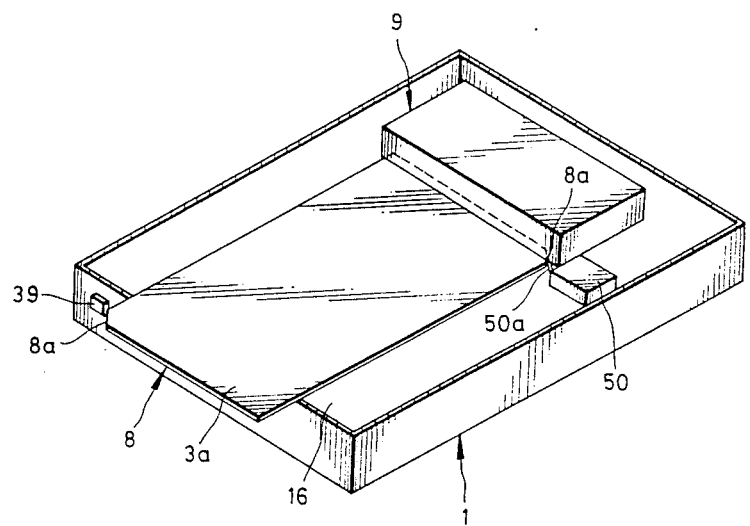
FIG. 8 is an illustration showing a transparent heat sensitive sheet with an indicium and a reader for the indicium provided in the overhead projector.

As is shown in FIG. 8, the heat sensitive sheet 8 comprises a transparent base sheet and a heat sensitive layer 3a coated on one surface of the base sheet and is provided with indicia 8a at asymmetrical positions relative to the center line in the direction of insertion for allowing easy and correct insertion of the sheet. The indicia 8a are, in this embodiment, formed by cutting off diagonally opposite triangular corners of the transparent heat sensitive sheet 8. For detecting that the transparent heat sensitive sheet 8 is inserted in the correct position, there is provided a detector 50. The detector 50 is a contact switch such as a micro switch having a contact 50a positioned to be pushed by a corner which has not been cut off, when the transparent heat sensitive sheet 8 is fully inserted the wrong way in the guideway 16 of the overhead projector. When the detector 50 is thus actuated by the transparent heat sensitive sheet 8 in the absence of an indicium 8a, the thermal head 9 is not actuated even through the copy switch 39 is operated. At this time, a warning is given as a result of operation of the copy switch 39. On the other hand, when the transparent heat sensitive sheet 8 is correctly inserted in the guideway and the detector 50 is not actuated, because it is in registry with an indicium 8a, the thermal head 9 is actuated when the copy switch 39 is operated. Instead of cutting the corner of the transparent heat sensitive sheet 8 in the form of a triangle, it is permissible to cut from the corner a rectangle.

Figure 9:
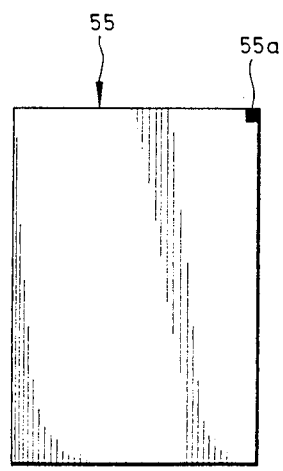
FIG. 9 is a plan view of a transparent heat sensitive sheet to which a different form of indicium is applied.
Figure 10:
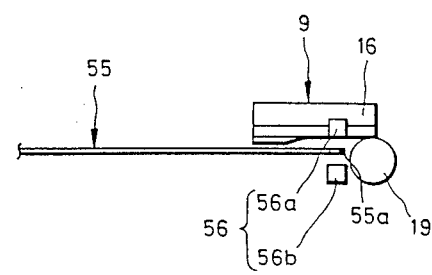
FIG. 10 is a side view schematically showing an indicium reader suitable for reading the indicium of the transparent heat sensitive sheet of FIG. 9.

FIG. 9 shows another embodiment of the transparent heat sensitive sheet 55 with an indicium 55a. This indicium may be formed by thermal printing when sheet 55 is cut off from a long web of heat sensitive sheet. In this case, the detector 50 is replaced with an optical detector 56 comprising, for example, a light-emitting and a light-receiving element 56a and 56b as is shown in FIG. 10.

Figure 11:
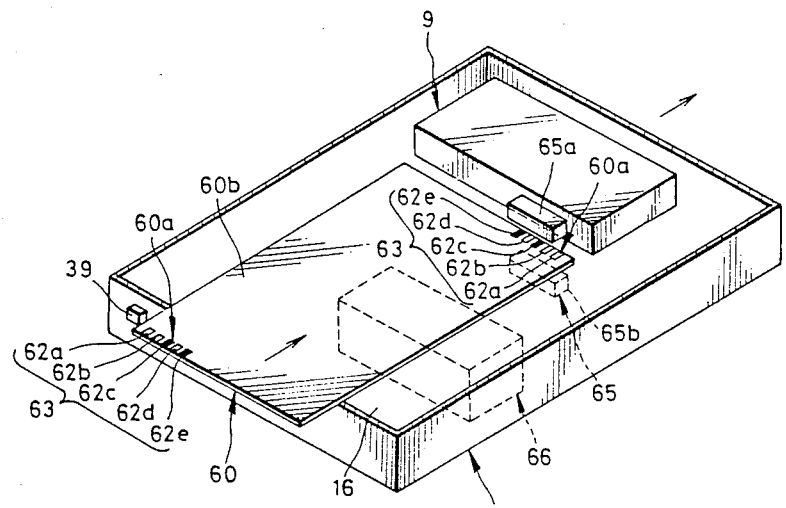
FIG. 11 is an illustration similar to FIG. 8 but differs therefrom as to the form of indicium.

FIG. 11 shows still another preferred embodiment of the transparent heat sensitive sheet 60 with indicia 60a. The transparent heat sensitive sheet 60 has a heat sensitive layer 60b applied to or coated on one surface of a transparent base sheet. The transparent heat sensitive sheet 60 is provided with an indicia area 63 comprising coded indicia 62a to 62e formed on the heat sensitive layer 60b on forward and rear edges at positions which are symmetrical relative to the longitudinal centerline of the transparent heat sensitive sheet 60. The indicia 60a indicate the heat sensitivity, size, thickness and color tone of the sheet 60, and a copying reduction ratio.

The indicia 60a include a thermally recorded, i.e. blackened, indicium located at least one of five possible code positions aligned in the indicia area 63. The indicia 62 can indicate up to 32 different data according to combinations of five possible code positions.

The indicia 60a are read by means of a reader 65 which is disposed in the base section 1 at a position wherein it can read the indicia 60a only when the transparent heat sensitive sheet 60 is correctly positioned. The reader 65 is for example an optical reader comprising a plurality of light emitting elements 65a and a plurality of light receiving elements 65b both of which are well known in the art. Each set of the light emitting and light receiving elements 65a setting circuit 66 with code signals so as automatically to set a proper copying condition according to the transparent heat sensitive sheet 60 inserted.

Figure 12:
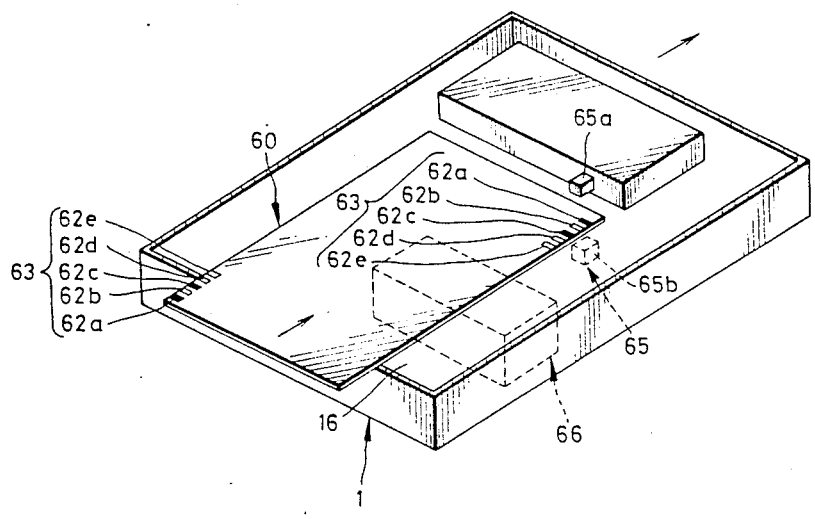
FIG. 12 is an illustration similar to FIG. 8 but showing still another indicium.

Alternatively, as shown in FIG. 12, the indicia 60a may be applied to opposite longitudinal edges symmetrically to the transverse centerline of the transparent heat sensitive sheet 60. The advantage of the provision of such indicia 60a arranged along the sides of the transparent heat sensitive sheet 60 is that the reader 65 need then comprise only a single set of the light emitting and light receiving elements 65a and 65b.

These indicia 63 may be thermally applied upon making heat sensitive sheets when cutting off the sheets from a long web of transparent heat sensitive material at the factory. Therefore, an extra marking apparatus is not needed and sheets bearing indicia are provided at low cost.

It is preferable to form the indicia 63 with at least one blackened code so that the reader 65 can judge whether the transparent heat sensitive sheet 60 is inserted in the correct way. In this case, it is possible to provide an alarm (not shown) when the transparent heat sensitive sheet 60 is inserted incorrectly.

Figure 13:
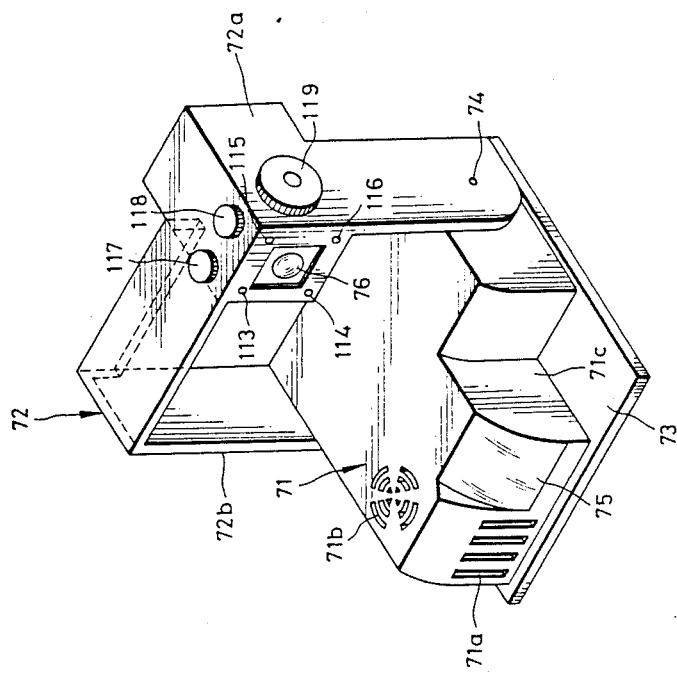
FIG. 13 is a perspective view showing a heat sensitive copying machine in use according to another preferred embodiment of the present invention.
Figure 14:
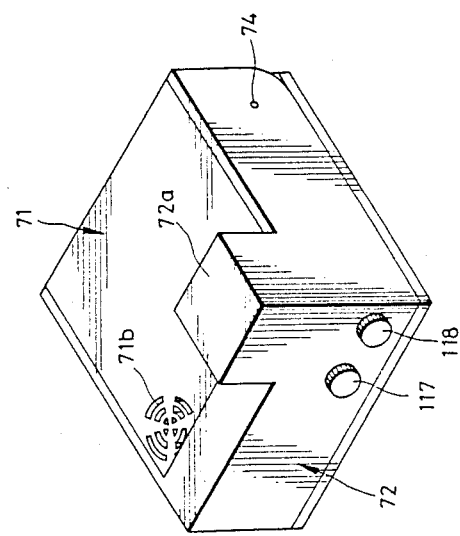
FIG. 14 is a perspective view showing the heat sensitive copying machine of FIG. 13 not in use.

Reference is now had to FIGS. 13 to 18 showing a heat sensitive copying apparatus suitable for making a hard copy of an image of, for example, a writing board disposed at a location spaced therefrom. The heat sensitive copying apparatus, which is shown in use in FIG. 13 and out of use in FIG. 14, comprises a generally box-shaped base section 71 disposed on a base plate 73 and an image pick-up unit 72 having a box-shaped housing 72a and arms 72b. The image pick-up unit 72 is supported for vertical swinging movement by a pivot shaft 74. When raised, the arms 72b at an approximately right angle to base plate 73, and the image pick-up unit 72 is maintained in this raised position by means of a click stop mechanism (not shown) well known in the art. The image pick-up unit 72 can be folded down as shown in FIG. 14 to form a box which is convenient to be carried.

As is shown in FIG. 13, the base section 71 is formed with slits 71a in its front wall for the inlet of fresh air and with exhaust slits 71b in its top wall for exhausting heated air. At the middle of the front wall, there is provided a transparent plate 75. In a front wall of the housing 72a of the image pick-up unit 72, there are a lens 76 and a light pattern projector comprising four light emitting elements 113 to 116 each providing a light spot. On the top wall of the housing 72a there are two knobs: one 117 for oppositely tilting the light projecting means 113 and 114 up and down and the other 118 for oppositely tilting the light projecting means 115 and 116 up and down. Furthermore, on the side wall of the housing 72a there is a knob 119 to move the lens 76 up or down.

Figure 15:
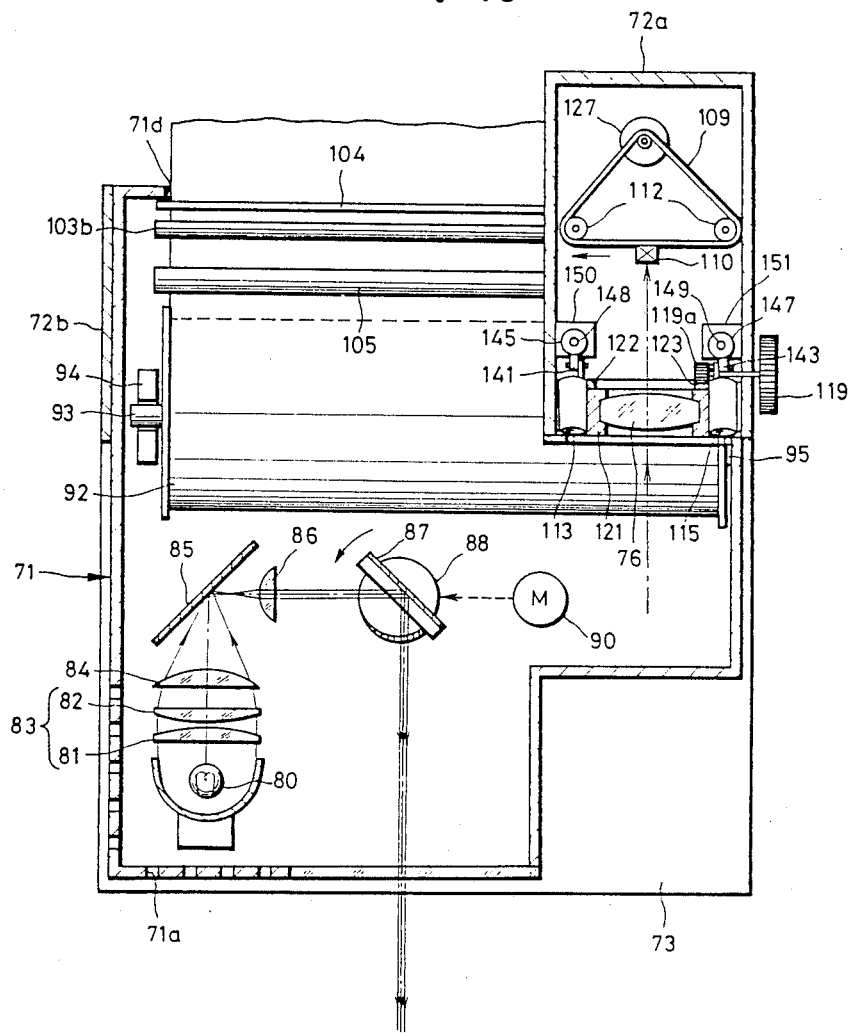
FIGS. 15 and 16 are sectional views showing details of interior mechanisms of the heat sensitive copying machine of FIG. 13.
Figure 16:
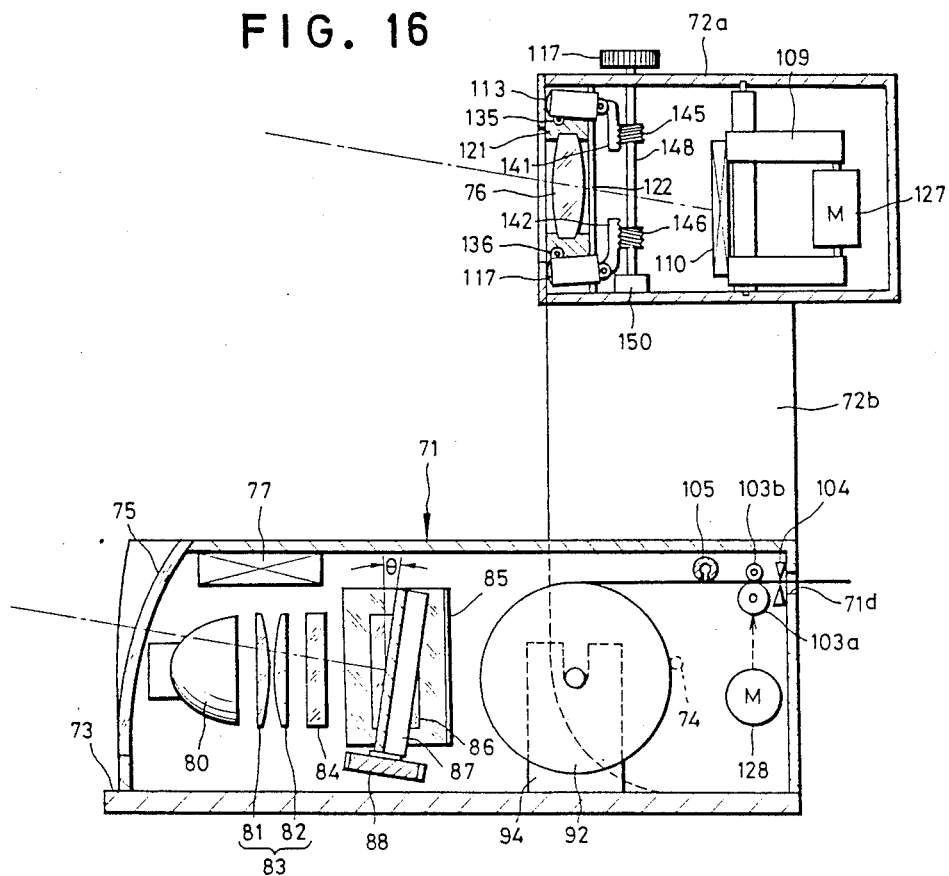

FIGS. 15 and 16 show details of the internal mechanisms of the apparatus. There is disposed in the base section 71 a halogen lamp 80 for projecting white light rearwardly. In front of the halogen lamp 80, there is a condenser lens system 83 comprising convex lenses 81 and 82, a first cylindrical lens 84 and a mirror 85. This mirror 85 is fixedly disposed at a right angle so as to reflect the light from the halogen lamp 80 at a right angle toward a scanning mirror 87.

In the optical path between the fixed mirror 85 and the scanning mirror 87 there is a second cylindrical lens 86 for transmitting the light projected from the halogen lamp 80 and reflected by the fixed mirror 85. The scanning mirror 87 is, as is clearly shown in FIG. 16, inclined at an angle $\theta$ relative to a vertical line so as to project the light forwardly and upwardly at a small angle to the horizontal through the transparent plate 75. The scanning mirror 87 is mounted on a gear disk 88 which is rotated by an electric motor 90 through a gear train. Inside the housing 72a there are provided a fan 77 disposed over the halogen lamp 80 for exhausting heat from the halogen lamp 80 through the exhaust slits 71b and between the lenses 83 and 84.

Behind the scanning mirror 87 there is a roll of heat sensitive paper 92 supported by a shaft 93 removably held by a pair of bearing arms 94 for rotation about its axis. In the back wall of the base section 71 there is formed a delivery slot 71b for the heat sensitive paper 92. Between the heat sensitive paper 92 and the delivery slot 71d there are transporting rollers 103a and 103b for transporting the heat sensitive paper 92 and a cutter 104 for cutting off the heat sensitive paper 92. Disposed adjacent to the roller 103b is a transversely linear thermal printing head 105 for printing a thermal image on the heat sensitive paper 92. Under the thermal printing head 105 there is disposed an electric motor 128 for driving the rollers 103a and 103b.

In the housing 72a of the image pick-up unit 72 there is a line sensor 110 comprising a CCD line array disposed behind the image taking lens 76. As is clearly seen in FIG. 15, the line sensor 110 is attached to a belt 109 guided by rollers 112 and moved to the right and left by means of an electric motor 127. The image taking lens 76 is designed to form a sharp image on the line sensor 110.

The light projecting means 113 and 114 are, as is shown in FIG. 16, pivoted on shafts 135 and 136, respectively for vertical swinging movement. Each light projecting means 113, 114 is provided with a rack 141, 142 in mesh with a worm gear 145, 146 fixed to a shaft 148 turned by the knob 117. Due to the worm-and-rack, the light projecting means 113 and 114 are tilted oppositely up and down at a desired angle. The shaft 148 is attached to a potentiometer 150 for detecting the angular position of the shaft and thus the tilted angle of the light projecting means 113 and 114. Since the light projecting means 115 and 116 are provided with the same tiling mechanism as the light projecting means 113 and 114, a detailed description is unnecessary.

The image taking lens 76 is mounted on a lens board 121 slidably supported between the front wall of the housing 72a and rail 122. The lens board 121 is provided with a rack 123 at the back thereof in mesh with a pinion gear 119a fixed to the knob 119. Owing to this rack and pinion, the image taking lens 76 is moved up or down by the operation of the knob 119.

Figure 17:
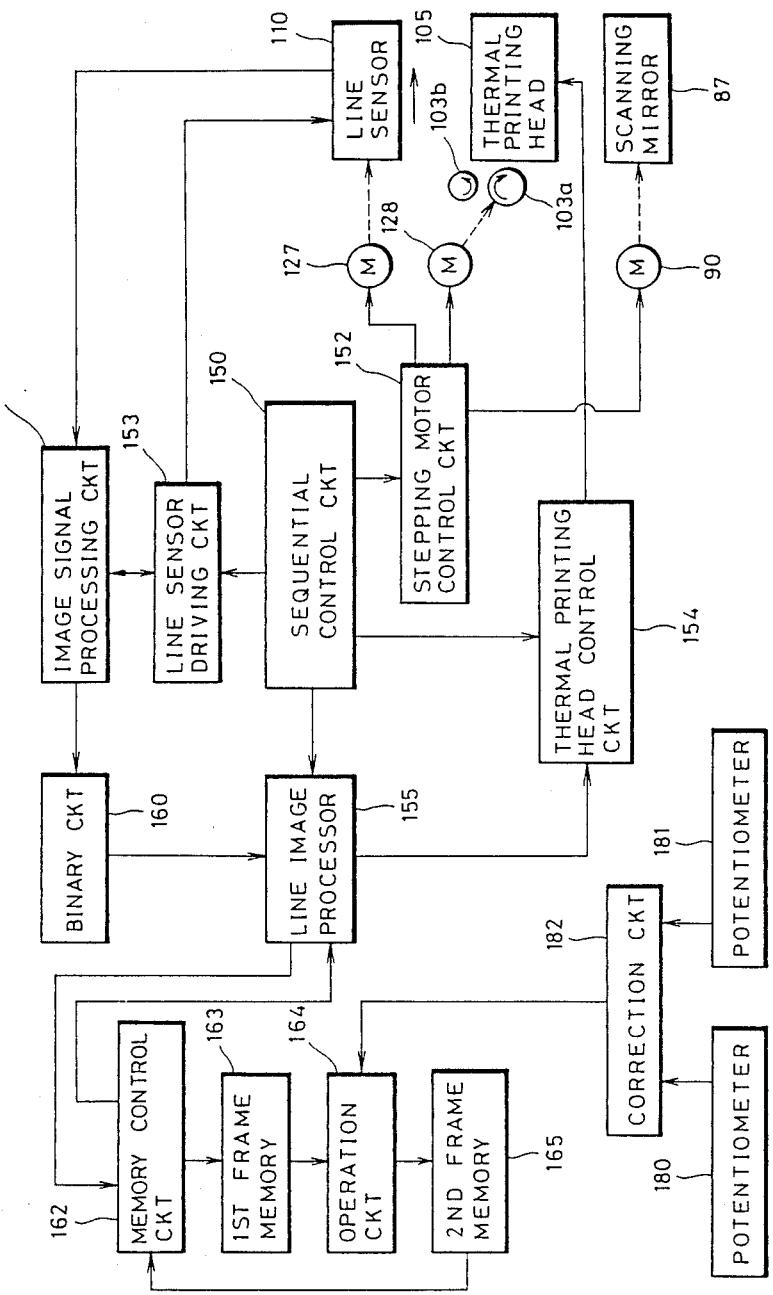
FIG. 17 is a block diagram showing a control circuit used in the heat sensitive copying machine of FIG. 13.

The apparatus thus constructed is controlled by a controller including a sequential control circuit 150 shown in FIG. 17. The sequential control circuit 150 executes a sequential control of operation according to a sequence program memorized in a memory thereof for a stepping motor control circuit 152, a line sensor driving circuit 153, a thermal printing head driving circuit 154 and a line image processor 155. This sequential control of operation is initiated by operating a copy switch (not shown) after exciting the halogen lamp 80.

Each circuit is operated by the control of the sequential control circuit 150 as follows: the stepping motor control circuit 152 controls the simultaneous driving of the motors 90, 127 and 128 for the line sensor scanning mirror 87, the line sensor 127 and the transporting roller 103a, respectively. The line sensor driving circuit 153 drives the line sensor 110 with a drive signal synchronized with a drive signal for the electric motor 127 and actuates an image signal processing circuit 156 for processing image signals provided by the line sensor 110. The thermal printing head driving circuit 124 drives the thermal printing head 105 in synchronism with the electric motor 128 according to image data provided from a line image processor 155.

The line sensor 110 reads sequential image signals line by line and sends the sequential image signals to the image signal processing circuit 156. The image signal processing circuit 156 processes the image signals for each line with a driving signal provided by the line sensor driving circuit 153 and transmits them transformed into an analog form to a binary circuit 160 wherein the analog time signals are translated into binary signals with reference to a predetermined threshold level and sent as image data to the line image processor 155.

Figure 18:
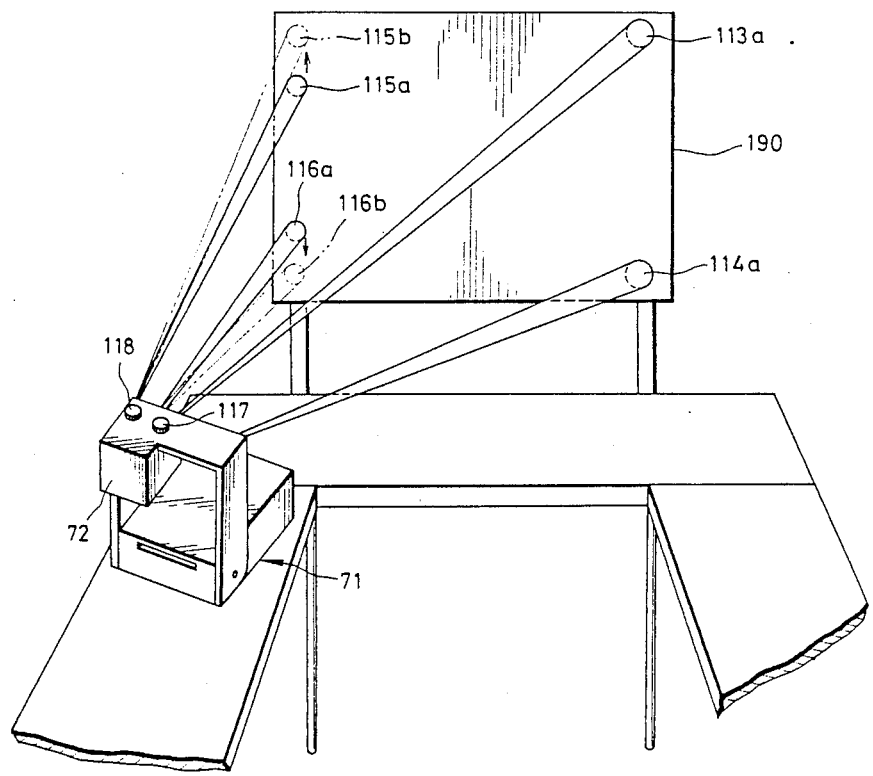
FIG. 18 is an illustration showing the heat sensitive copying machine used to make a hard copy of a surface of a writing board.

The line image processor 155 sends the image data thus digitalized to a first frame memory 163 through a memory control circuit 162 for memorization. As is shown in FIG. 18, if the apparatus is displaced sideways off-center of a writing board 190, an image is formed on a plane scanned by the line sensor 110 in perspective, namely in the form of a trapezoid with one side shortened. Therefore, in this case, an image which is originally in the form of a rectangle is read by the line sensor 110 as a trapezoidal image and so memorized in the frame memory 163.

But according to the present invention, there is connected to an operating circuit 164 connected to the first frame memory 163 a correcting circuit 182 which provides the operating circuit 164 with a correction signal based on the difference between outputs from the potentiometers 180 and 181 for correcting the perspective attending an image formed on the plane scanned by the line sensor 110. The operating circuit 164 performs an operation for transforming the image data read out from the first memory with the correction signal so as to reform the trapezoidal image with one side shortened, into its original rectangular image. The image data after this correction in the operating circuit 182 are then transmitted to a second frame memory 165. The line image processor 155 reads out the image data in the second frame memory 165 through the memory control circuit 162 and sends them to the thermal head control circuit 154. The memory control circuit 162 controls the transmission of image data from the line image processor 155 to the first frame memory 163 and the transmission of corrected image data from the second frame memory 165 to the line image processor 155.

In the operation of the heat sensitive copying apparatus shown in FIGS. 13 to 17, the image pick-up unit 72 is raised in operating position as shown in FIG. 13 and placed on a table as shown in FIG. 18. The heat sensitive copying apparatus may be placed at any desired position. In FIG. 18, the heat sensitive copying apparatus is so placed on the table in front of the left side of a writing board 190 as to view the center of the writing board 190 sideways at an acute angle. If the upper part of the writing board 190 is not covered by the field of view of the image taking lens 76, the whole area of the writing board 190 can be brought into the field of view by inclining the heat sensitive copying apparatus upward at an angle so as to view the center of the writing board. In this case, however, the image taking lens 76 will form a distorted image which is generally trapezoidal. Therefore, the knob 119 is operated to raise the lens board 121 so as to align a straight line interconnecting the centers of the image taking lens 76 and the line image sensor 110 with the center of the writing board 190. When the heat sensitive copying apparatus is powered, each of the light projectors 113 to 116 emits a spot light onto the writing board 190. Because the light projectors 115 and 116 on the outside of the image pick-up unit 72 are closer to the writing board 190 than the remaining light projectors 113 and 114, the vertical distance between the light spots 115a and 116a projected by the light projectors 115 and 116 is shorter than that between the light spots 113a and 114a projected by the light projectors 113 and 114, respectively, as is shown by a solid line in FIG. 18. In such a case, the knob 118 is turned so as to tilt the light projectors 113 and 114 oppositely up and down in order to move respectively up and down the light spots 115a and 116a to positions indicated by line in FIG. 18, thereby to adjust the vertical distance between the light spots 115a and 116a to equal that between the light spots 113a and 114a.

Rotated angles or angular positions of the knobs 117 and 118 which are different from each other are detected by the potentiometers 180 and 181 through the shafts 148 and 149, respectively. Outputs from the respective potentiometers 150 and 151 are sent to the correction circuit 182 wherein any difference between the outputs determines the degree of perspective to be corrected. The correction circuit 182 sends a correction signal corresponding to the obtained difference to the operating circuit 164.

After shutting off the power to the light projectors 113 to 116, the halogen lamp 80 is excited to emit light toward the writing board 190. Simultaneously, the fan 77 is actuated to exhaust heat from the halogen lamp 80 through slits 71b. The scanning mirror 87 projects a vertical line of light onto the writing board 190. After adjusting the line of light to an edge of an area of the writing board to be copied, the copy switch is operated. Consequently, the sequential control circuit 150 executes the sequential program and sends actuation signals to the stepping motor control circuit 152, line sensor drive circuit 153 and line image processor 155. Then, the stepping motor control circuit 152 causes the stepping motors 90 and 127 to rotate. Consequently, the scanning mirror 87 is turned in synchronism with the lateral movement of the line sensor 110.

The light from the halogen lamp 80 is caused to converge as a thin vertical line of light by the condenser lens assembly 83 and the cylindrical lens 84. After having been reflected by the fixed mirror 85, the vertical line of light is slightly expanded in width by the cylindrical lens 86 and directed to the scanning mirror 87. The scanning mirror 87 scans the front surface of the writing board 190 with the vertical scanning light that has passed through the transparent plate 75.

Because the image taking lens 76 forms a focused linear image of the surface of the writing board 190 on the line sensor 110, the line sensor 110 provides sequential image signals for the scanned lines in synchronism with the scanning mirror 87, which are sent to the image signal processing circuit 156. With synchronizing signals provided by the line sensor driving circuit 153, the image signal processing circuit 156 processes the image signals for each line image and then transmits the processed image signals to the binary circuit 160 for transformation into a digital form. The line image processor 155 transmits the digital image data to be memorized in the first frame memory 163 through the memory control circuit 162.

When the scanning mirror 87 has scanned the entire writing board 190, the line sensor 110 completes reading line images over the writing board 190. As a result, image data for one frame, after having been transformed into a digital form, are memorized in the first frame memory 163. The sequential control circuit 150 detects the line sensor 110 having moved to an extremity of the moving area to provide the line sensor 110 with an end signal by which the stepping motor control circuit 152 reverses the electric motors 127 and 90 so as to return the line sensor 110 to the opposite extremity of the moving area. Following the stopping of the electric motors 127 and 90, the sequential control circuit 150 provides the stepping motor control circuit 152, the line image processor 155 and the thermal printing head control circuit 154 with start signals, so that the electric motor 128 rotates the roller 33a to transport the heat sensitive sheet 92 toward the slot 71d.

On the other hand, the correction circuit 182 provides and sends a correction signal based on the output from the potentiometers 150 and 151 to the operation circuit 164. The operation circuit 164 effects an operation for correcting the image data read out from the first frame memory 163 to provide an image without distortion. The corrected image data are memorized in the second frame memory 165 and then read out and sent to the thermal printing head control circuit 154 through the line image processor 155.

The thermal printing head control circuit 154 drives the thermal printing head 105 in synchronism with the stepping motor 128 and hence the roller 103a, to form a thermal image on the heat sensitive sheet 92 according to the image data read out from the second frame memory 165 through the line image processor 155. After the completion of thermal printing for one frame, the sequential control circuit 150 provides the line image processor 155 and the thermal printing head control circuit 154 with end signals and the stepping motor control circuit 152 with a control signal. Upon receiving this control signal, the stepping motor control circuit 152 causes the electric motor 128 to turn so as to transport the heat sensitive sheet 92 in order to discharge the printed part of the heat sensitive sheet 92 from the apparatus through the slot 71d. Then, the sequential control circuit 150 terminates the sequential operation of printing. Thereafter, the cutter 114 is actuated to cut off the printed part of the heat sensitive sheet 92, thereby providing a hard copy.

After cutting off the printed part to provide a hard copy, the halogen lamp 80 is turned off. It is preferred to leave the fan 77 operating for a while so as to cool the inside of the apparatus. After the fan 77 is stopped, the image taking unit 72 is folded down as is shown in FIG. 14. In the folded position, the image taking unit 72 covers and protects the transparent plate 75 and, on the other hand, the lens 76 is protected by base plate 73 of the base section 71.

In the described apparatus, it is of course permissible to adjust both of the potentiometers 150 and 151. In this case the correcting circuit 152 provides a correction signal based on the difference of outputs of the two potentiometers. Although, for correcting a perspective, the pattern projector projects spot lights as a light pattern, it may be provided to project a light pattern such as two horizontal lines of light separated from and parallel to each other, or a generally rectangular light pattern.

Although the present invention has been fully described in association with the preferred embodiments thereof with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A heat sensitive copying machine for making a transparent copy from a reflecting original, comprising;
   an image sensor for reading an image of a reflecting original to provide image signals;
   thermal printing means for printing a mirror image of said reflecting original on a transparent heat sensitive sheet responsive to said image signals read by said image sensor, thereby providing a transparent secondary original;
   said image sensor and said thermal printing head being incorporated in an overhead projector comprising a Fresnel plate on which said transparent secondary original is placed with its image surface down;
   a light source for illuminating said transparent secondary original from said image surface side; and
   a projection lens assembly supported by an arm above said Fresnel plate for projecting an image of said transparent secondary original onto a remote screen.

2. A heat sensitive copying machine as defined in claim 1, wherein said image sensor is a line image sensor disposed in said arm of said overhead projector.

3. A heat sensitive copying machine as defined in claim 1, further comprising a memory for memorizing said image signal provided by said image reading sensor.

4. A heat sensitive copying machine for printing a thermal image of a reflecting original on a heat sensitive sheet comprising a base sheet having a layer of heat sensitive material on one surface thereof, said heat sensitive copying machine comprising:
   an image sensor for reading an image of said reflecting original to provide image signals;
   a thermal printing head for printing a thermal image on said heat sensitive sheet responsive to said image signals read by said image sensor; and
   indicia detecting means for detecting indicia provided at positions near front and rear edges of said heat sensitive sheet symmetrically with respect to a centerline of said heat sensitive sheet when said heat sensitive sheet is correctly placed on said machine.

5. A heat sensitive copying machine as defined in claim 4, further comprising memory means for memorizing said image signals provided by said image sensor.

6. A heat sensitive copying machine as defined in claim 4, wherein said heat sensitive sheet is transparent.

7. A heat sensitive copying machine as defined in claim 6, wherein said detecting means is a mechanical contact switch which is turned on or off by one of said indicia in the form of a cut-off corner of said heat sensitive sheet.

8. A heat sensitive copying machine as defined in claim 6, wherein said detecting means is an optical reader which reads said one of said indicia in the form of a coded optical mark.

9. A heat sensitive copying machine as defined in claim 8, wherein said detecting means comprises light emitting and light receiving elements disposed along a line with which a front edge of said heat sensitive sheet is to be aligned.

10. A heat sensitive copying machine as defined in claim 8, wherein said detecting means comprises light emitting and light receiving elements disposed along a line with which a side of said heat sensitive sheet is to be aligned.

11. A copying machine for making a hard copy from a substantially rectangular original spaced but visible therefrom comprising:
    an image sensor for reading an image of a said spaced but visible original to provide image signals;
    pattern projecting means for projecting a light pattern onto said original;
    adjusting means for adjusting said light pattern projected onto said original so as to be congruent with the rectangular outline of said original;
    means for providing a signal proportional to the degree of said adjustment of said light pattern by said adjusting means;
    correcting means for electrically correcting said image signals provided by said image sensor so as to eliminate geometrical perspective included in said image signals; and
    printing means for printing an image on a copying sheet according to said corrected image signals, thereby providing a hard copy with an image analogous to said image of said original.

12. A copying machine as defined in claim 11, wherein said pattern projecting means is adapted to project a light pattern comprising four light spots projected one on each corner of said remote original.

13. A copying machine as defined in claim 12, wherein said pattern projecting means comprises two pairs of light spot projecting means, each comprising a pair of light spot projecting means adapted to tilt up and down in the opposite vertical directions.

14. A copying machine as defined in claim 11, wherein said pattern projecting means is adapted to project a light pattern comprising two horizontal light lines in parallel with each other.

15. A copying machine as defined in claim 11, wherein said pattern projecting means is adapted to project a rectangular light pattern.

16. A copying machine as defined in claim 11, wherein said printing means is a thermal printing head for forming a thermal image on a heat sensitive sheet responsive to said corrected image signals.

17. A copying machine as defined in claim 16, wherein said heat sensitive sheet is transparent.

18. A copying apparatus for making a hard copy from an original remote therefrom comprising;
    an image taking lens for forming an image of a remote original in an image plane thereof;
    image reading means disposed in said image plane for reading said image of said remote original formed thereon to provide image signals;
    printing means for printing an image on a recording sheet responsive to said image signals provided by said image reading means; and
    means for moving up or down said image taking lens in parallel with said image reading means so as to view the center of said remote original.

19. A copying machine as defined in claim 18, wherein said image reading means is a line image sensor.

20. A copying machine as defined in claim 19, wherein said printing means includes a thermal printing head for forming a thermal image on a heat sensitive sheet.

21. A copying machine as defined in claim 20, wherein said heat sensitive sheet is transparent.

22. A rectangular heat sensitive sheet having thermally printed thereon indicia that are readable by a copying machine, said indicia being provided near front and rear edges of said heat sensitive sheet symmetrically with respect to a centerline of said heat sensitive sheet such that said sheet can be inserted into a said copying machine in opposite directions with the copying machine reading the indicia the same in either of said directions.

23. A heat sensitive sheet as defined in claim 22, wherein said indicia are provided along front and rear edges of said heat sensitive sheet.

24. A heat sensitive sheet as defined in claim 22, wherein said indicia are provided along opposite side edges of said heat sensitive sheet.

25. A heat sensitive sheet as defined in claim 22, wherein said indicia include an optically detectable coded mark.

26. A heat sensitive sheet as defined in claim 25, wherein said mark indicates at least one surface on which an image is to be printed.

27. A heat sensitive sheet as defined in claim 26, wherein said mark indicates at least one of heat sensitivity, size, thickness and coloring.

* * * * *